US010331736B2

(12) United States Patent
Beckhardt et al.

(10) Patent No.: US 10,331,736 B2
(45) Date of Patent: Jun. 25, 2019

(54) FACILITATING STREAMING MEDIA ACCESS VIA A MEDIA-ITEM DATABASE

(71) Applicant: Sonos, Inc., Santa Barbara, CA (US)

(72) Inventors: Steven Beckhardt, Boston, MA (US); Gregory Paul Ramsperger, Somerville, MA (US)

(73) Assignee: Sonos, Inc., Santa Barbara, CA (US)

( * ) Notice: Subject to any disclaimer, the term of this patent is extended or adjusted under 35 U.S.C. 154(b) by 228 days.

(21) Appl. No.: 14/222,234

(22) Filed: Mar. 21, 2014

(65) Prior Publication Data
US 2015/0269200 A1 Sep. 24, 2015

(51) Int. Cl.
G06F 16/68 (2019.01)
(52) U.S. Cl.
CPC .................... G06F 16/68 (2019.01)
(58) Field of Classification Search
CPC ......... G06F 17/30312; G06F 17/30386; G06F 16/68
USPC ....................................................... 707/792
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,905,865 | A * | 5/1999 | Palmer .................. H04H 20/18 348/E5.006 |
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |

(Continued)

FOREIGN PATENT DOCUMENTS

| EP | 1389853 A1 | 2/2004 |
| KR | 20010090215 | 10/2001 |

(Continued)

OTHER PUBLICATIONS

"AudioTron Quick Start Guide, Version 1.0", Voyetra Turtle Beach, Inc., Mar. 2001, 24 pages.

(Continued)

Primary Examiner — Tony Mahmoudi
Assistant Examiner — Michael Le
(74) Attorney, Agent, or Firm — McDonnell Boehnen Hulbert & Berghoff LLP

(57) ABSTRACT

Embodiments are described herein that include a method involving a computing system receiving a first message from a first playback device and a second message from a second playback device. The first message and the second message including first metadata and second metadata, respectively. The computing system determines that the first media item and the second media item are the same based on the received first metadata and the received second metadata, and in response, stores association data. The computing system receives an identification of one or more streaming services accessible by the third playback device which includes the first streaming service, and a media-item request including the second service media-item identifier used by the second streaming service. In response to receiving the media-item request, facilitating media streaming access to the first media item by the third playback device using the first streaming service.

20 Claims, 12 Drawing Sheets

(56) References Cited

U.S. PATENT DOCUMENTS

| | | |
|---|---|---|
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,788,138 B2 | 8/2010 | Viehmann et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 9,294,840 B1* | 3/2016 | Anderson ............... H04R 5/00 |
| 9,489,383 B2 | 11/2016 | Hyman et al. |
| 9,529,979 B2 | 12/2016 | Torgerson et al. |
| 9,547,647 B2 | 1/2017 | Badaskar et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0054134 A1 | 5/2002 | Kelts |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0034650 A1* | 2/2004 | Springer, Jr. ..... G06F 17/30038 |
| 2007/0142944 A1 | 6/2007 | Goldberg et al. |
| 2008/0052371 A1 | 2/2008 | Partovi et al. |
| 2010/0075313 A1 | 3/2010 | Kreuwel et al. |
| 2010/0106848 A1* | 4/2010 | van Hoff ............ H04N 21/431 709/231 |
| 2012/0173666 A1* | 7/2012 | Jellison, Jr. et al. ....................... G06F 17/30749 709/217 |
| 2013/0311997 A1* | 11/2013 | Gruber ................. G06Q 10/10 718/102 |
| 2014/0189648 A1 | 7/2014 | Everitt |
| 2017/0177585 A1 | 6/2017 | Rodger et al. |

FOREIGN PATENT DOCUMENTS

| | | |
|---|---|---|
| KR | 20050051785 | 6/2005 |
| WO | 0153994 | 7/2001 |
| WO | 2003093950 A2 | 11/2003 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Buskirk; Eliot Van., "Music Needs 'Connective Tissue' and Facebook Wants to Build it", Evolver-1m, http://evolver.fm/2011/09/01/music-needs-connective-tissue-and-facebook-wants-to-build-iti, Sep. 1, 2011, 6 pages.

Jo J., et al., "Synchronized One-to-many Media Streaming with Adaptive Playout Control," Proceedings of SPIE, 2002, vol. 4861, pp. 71-82.

"UPnP; "Universal Plug and Play Device Architecture", Jun. 8, 2000; version 1.0; Microsoft Corporation; pp. 1-54".

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000" May 2000, 138 pages.

"Denon 2003-2004 Product Catalog," Denon, 2003-2004, 44 pages.

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

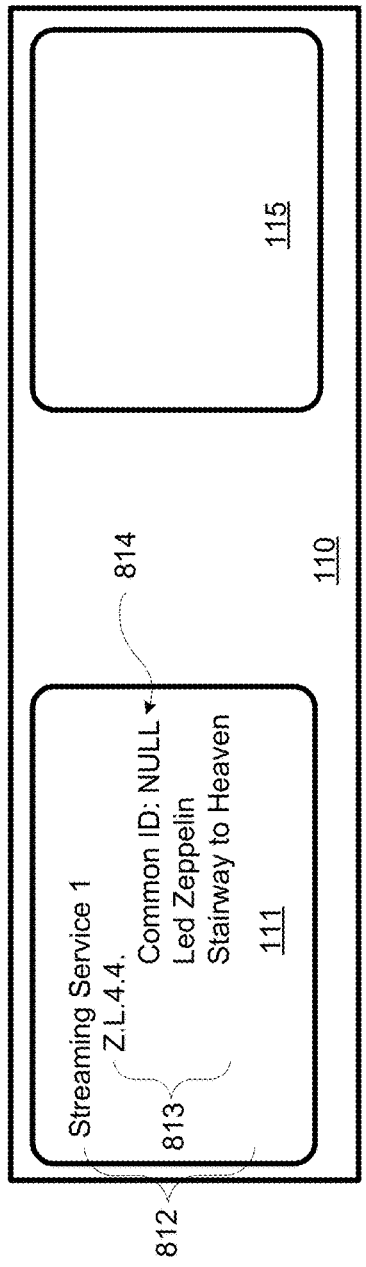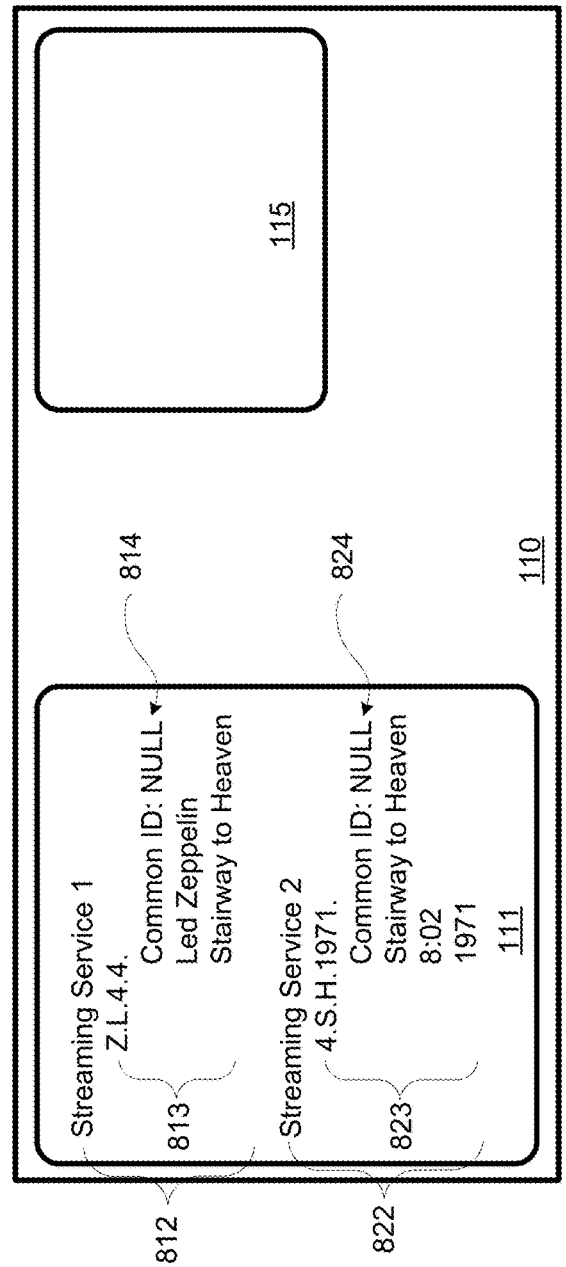

FACILITATING STREAMING MEDIA ACCESS VIA A MEDIA-ITEM DATABASE

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 8A-8E show an example database at various points in time; and

Figure 1A:
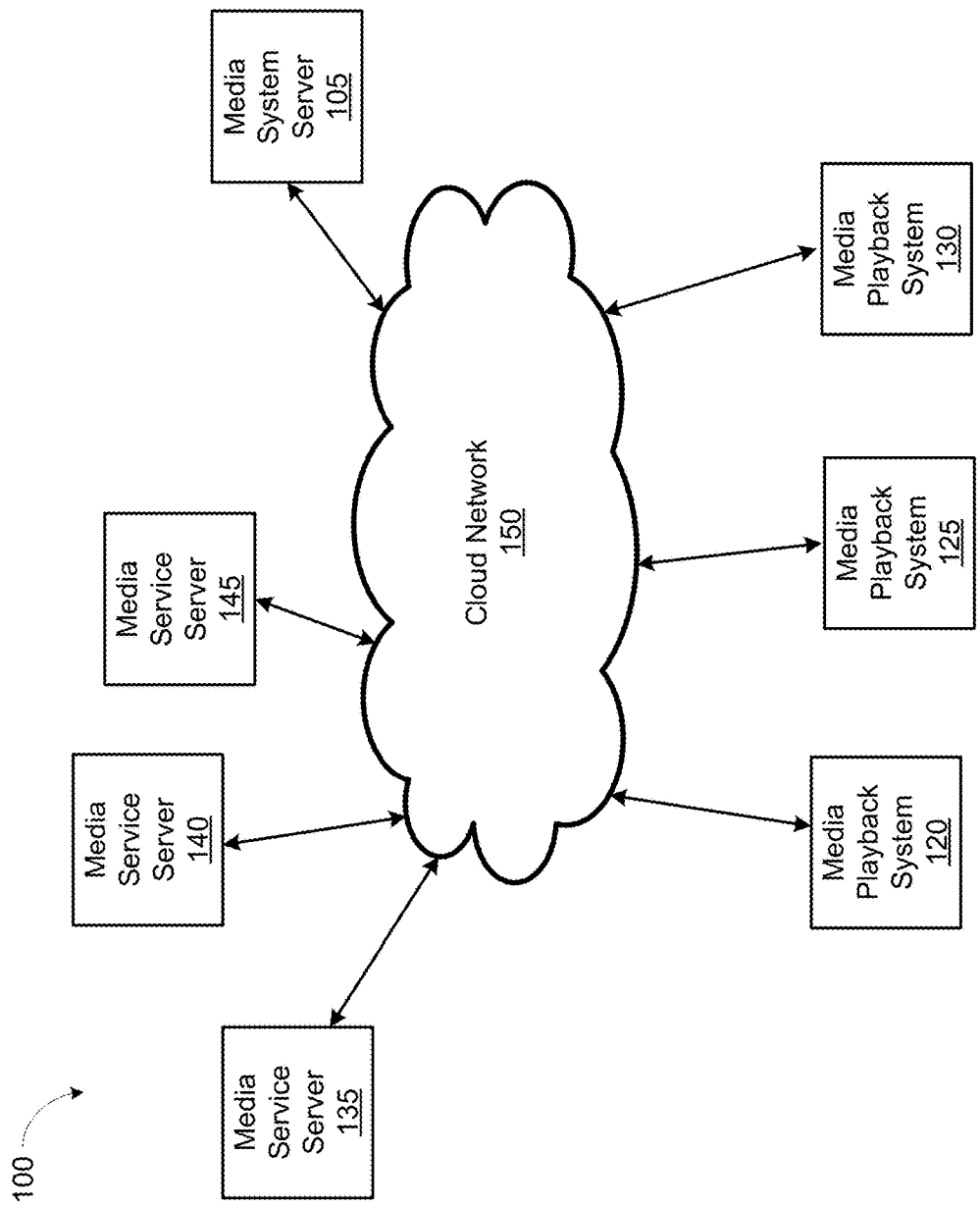
FIG. 1A shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Streaming media services (e.g., Pandora® Radio, Spotify®, Slacker® Radio, Google Play™, iTunes Radio℠, and others) have become a popular source of media for playback on playback devices. Generally, each media service may maintain a respective database that includes media provided by the respective media service. And typically, each respective database may be maintained in a unique manner. As such, information used to retrieve media from a first media service may not be useful for retrieving media from a second media service. Accordingly, embodiments described herein provide a media-item database that may facilitate accessing, by a playback device, media from a given media service using information related to a different media service. Aspects of the media-item database may be maintained using information from various sources, perhaps in a "crowd-sourced" manner.

For example, a computing system (e.g., a cloud server) may receive a first message from a first playback device. For example, after or while the first playback device plays a first media item (e.g., an audio track), the first playback device may transmit the first message to the computing system. The first message may identify a first service used by the first playback device to obtain the first media item for playback. The first message may also include a first service media-item identifier that the first service uses to identify the first media item. Further, the first message may include a first metadata that is associated with the first media item (e.g., a track title, artist name, album title, etc.). The computing system may store some or all of this first message information, perhaps in a database that is associated with such information.

The computing system may thereafter receive a second message from a second playback device. As with the first message, the second message may identify a second service used by the second playback device to obtain a second media item for playback, a second service media-item identifier used to identify the second media item, and a second metadata that is associated with the second media item. The computing device may store some or all of this second message information in the database.

The computing system may then compare the second metadata with the first metadata that was previously stored in the database to determine if, and to what extent, the first metadata and the second metadata have any similarities. If the computing system determines that the second metadata and the first metadata are substantially similar, the computing system may infer that the first media item and the second media item are the same. In response, the computing system may store association data in the database indicating that the first service media-item identifier and the second service media-item identifier identify media items that include the same content. As a result of such an association, the computing system may be able to retrieve the second service media-item identifier using the first service media-item identifier and vice versa.

As discussed in further detail below, a computing system may maintain a crowd-sourced database over time as playback devices play media items. Such a database may include a table of service media-item identifiers that may be used in later applications, for example, in cross-service linking (e.g., where a user wishes to play at a playback device media for which the playback device does not have a corresponding service media-item identifier). In this regard, the computing system may facilitate accessing, by a playback device, media items from a given media service using information related to a different media service.

As indicated above, examples provided herein relate to maintaining a media-item database. In one aspect, a method is provided. The method involves (a) receiving by a computing system a first message from a first playback device, where the first message identifies at least (i) a first service used by the first playback device to obtain a first media item for playback, (ii) a first service media-item identifier used by the first service to identify the first media item, and (iii) a first metadata, (b) receiving by the computing system a second message from a second playback device, where the second message identifies at least (i) a second service used by the second playback device to obtain a second media item for playback, (ii) a second service media-item identifier used by the second service to identify the second media item, and (iii) a second metadata, (c) determining by the computing system that the first media item and the second media item are the same, and (d) in response to the determination, storing by the computing system association data that associates the first service media-item identifier and the second service media-item identifier.

In another aspect, a non-transitory computer readable medium is provided. The non-transitory computer readable having instructions stored thereon that are executable by at least one processor. The instructions include instructions for (a) receiving by a computing system a first message from a first playback device, where the first message identifies at least (i) a first service used by the first playback device to obtain a first media item for playback, (ii) a first service media-item identifier used by the first service to identify the first media item, and (iii) a first metadata, (b) receiving by the computing system a second message from a second playback device, where the second message identifies at least (i) a second service used by the second playback device to obtain a second media item for playback, (ii) a second service media-item identifier used by the second service to identify the second media item, and (iii) a second metadata, (c) determining by the computing system that the first media item and the second media item are the same, and (d) in response to the determination, storing by the computing system association data that associates the first service media item identifier and the second service media-item identifier.

In an example aspect, a computing system is provided. The computing system includes a network interface, where the network interface communicatively couples the computing system to one or more playback devices. The computing system also includes a non-transitory computer readable medium and program instructions stored on the non-transitory computer readable medium. The program instructions are executable by at least one processor to cause the computing system to (a) receive a first message from a first playback device, where the first message identifies at least (i) a first service used by the first playback device to obtain a first media item for playback, (ii) a first service media-item identifier used by the first service to identify the first media item, and (iii) a first metadata, (b) receive a second message from a second playback device, where the second message identifies at least (i) a second service used by the second playback device to obtain a second media item for playback, (ii) a second service media-item identifier used by the second service to identify the second media item, and (iii) a second metadata, (c) determine that the first media item and the second media item are the same, and (d) in response to the determination, store association data that associates the first service media item identifier and the second service media-item identifier.

It will be understood by one of ordinary skill in the art that this disclosure includes numerous other embodiments.

II. Example Network Configuration

FIG. 1A shows an example network configuration 100 in which one or more embodiments disclosed herein may be practiced or implemented. As shown, the network configuration 100 may include a media system server 105, one or more media playback systems 120, 125, and 130, one or more media service servers 135, 140, and 145, and a cloud network 150. It should be understood that the network configuration 100 may include additional network elements as well.

The cloud network 150 may communicatively couple the various network elements of the network configuration 100. In such an arrangement, the media system server 105 may communicate with any of the media playback systems 120-130 and/or any of the media service servers 135-145 via the cloud network 150. Similarly, any of the media playback systems 120-130 may communicate with any of the media service servers 135-145 via the cloud network 150. Further, the media playback systems 120-130 may communicate with one another via the cloud network 150. The cloud network 150 may be, for example, a wide-area network (WAN). As such, the cloud network 150 may include the Internet and/or one or more cellular networks, among other networks.

Generally speaking, a media playback system 120-130 may be any type of media playback system configured to receive and transmit data over a data network and playback media items. Each of the media playback systems 120-130 may be physically located in different locations. Alternatively, two or more of the media playback systems 120-130 may be physically located in the same location (e.g., an office building). In practice, a media playback system 120-130 may include one or more playback devices. Such a media playback system is discussed in further detail below with reference to example media playback system 200.

A media service server 135-145 may include at least one processor, data storage, and a network interface, among other components. A media service server 135-145 may be configured to store media items (e.g., a media library) and/or access such media items to stream to a playback device. A media service server 135-145 may also create or obtain metadata related to the media items, as well as store such metadata. In example implementations, one media service server may create or obtain certain metadata that another media service server lacks. For example, the media service server 135 may create or obtain genre metadata while the media service server 140 does not create or obtain such metadata. Other examples are possible as well.

In practice, the media service servers 135-145 may provide streaming media services to the media playback systems 120-130. In particular, each media service server may provide "Internet radio" service and/or "on-demand" service (e.g., where a user may request a particular media item) to one or more of the media playback systems 120-130. When a media service server 135-145 provides a media item to a media playback system, the media service server may provide metadata along with the streamed media item.

The media system server 105 may include a network interface, a processing unit, and data storage, all of which may be communicatively linked together by a system bus, network, or other connection mechanism. The network interface may facilitate data flow between the media system server 105 and other network elements on the cloud network 150. The processing unit may include one or more general purpose processors and/or one or more special purpose processors and may be integrated in whole or in part with the network interface.

The data storage may include a non-transitory computer readable medium, such as optical, magnetic, or flash memory, and may be integrated in whole or in part with the processing unit. The data storage may then include program instructions that are executable by the processing unit to carry out various functions described herein.

The data storage may also include a database that may contain data related to media items. The data may be stored in the form of a table or the like. In some implementations, the database may include entries for predetermined metadata fields (e.g., a track title field, an artist/band name field, an album name field, etc.) that may be populated with metadata from received messages. Additionally or alternatively, the media system server 105 may dynamically create entries in the database as the media system server 105 receives messages. Other examples are certainly possible.

Figure 1B:
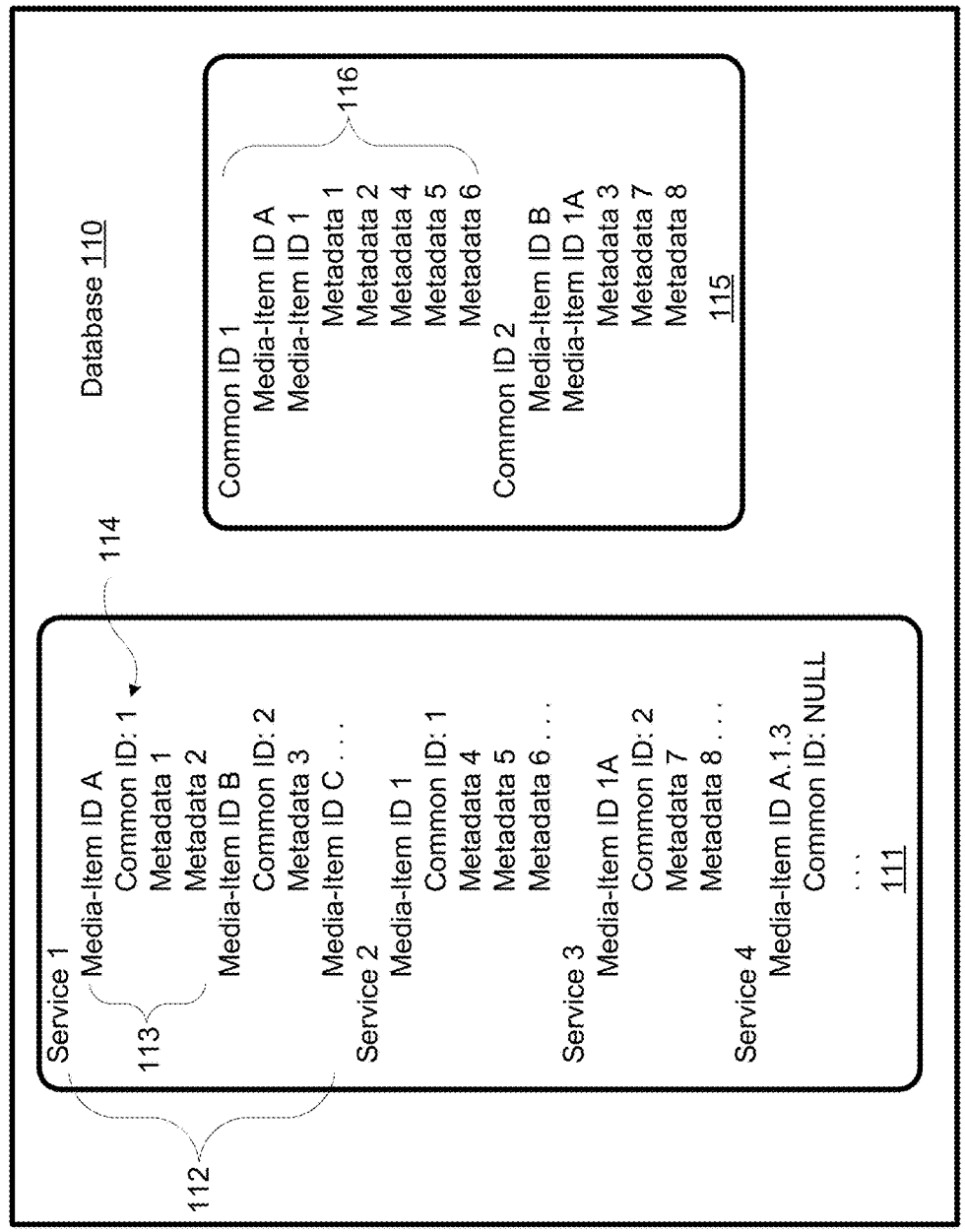
FIG. 1B shows an example database.

For purpose of illustration, FIG. 1B shows an example database 110 stored in the data storage of the media system server 105. As shown, the database 110 may include a received message table 111 that may include received message data and association table 115 that may include association data. It should be understood that the database 110 may include other tables and/or other data as well.

The received message table 111 may include data received by the media system server 105 from, for example, one or more of the media playback systems 120-130. A device of the media playback system, such as a playback device, may send a message to the media system server 105 that provides information regarding a media item that the playback device obtained from a media service server. For example, a playback device may transmit such a message to the media system server 105 while or after the playback device plays the media item. The message may include a name (or other identifier) of the media service that provided (or is providing) the media item to the playback device, a service media-item identifier that is used by the media service to identify the media item, and metadata associated with the media item, among other information.

As shown, the received message table 111 may include multiple service entries 112 and each service entry may include one or more service media-item identifier entries 113. A service entry may include the name (or other indicator) of the media service and data that was included in any messages that identified that media service as the provider of the media item. For example, when the media system server 105 receives a message that includes Service 1, the media system server 105 may store data from that message in the Service 1 entry.

In particular, such data may be stored in a service media-item identifier entry 113 within the service entry 112. A service media-item identifier entry 113 may include an indication of the service media-item identifier, metadata associated with media-item that is identified by the particular service media-item identifier, and a common identifier entry 114, among other information. A common identifier may be generated by the media system server 105 when the media system server 105 determines that two or more service media-item identifiers identify media items that are the same and are therefore associated. Accordingly, a service media-item identifier entry 113 may have a common identifier entry 114 that either has a common identifier or a null value. A null value may indicate that the particular service media-item identifier is not yet associated with another service media-item identifier.

When a common identifier is generated, the media system server 105 may create an association entry 116 in the association table 115. An association entry 116 may include an indication of the common identifier and two or more associated service media-item identifiers. An association entry 116 may include additional information as well, such as metadata from the service media-item identifier entries that correspond to the two or more associated service media-item identifiers.

In practice, the media system server 105 may be configured to receive from a media playback system (e.g., the media playback system 120) a media-item request message. The request message may include the name of the media service from which the media playback system 120 would like to receive a media item (e.g., "Service 1") and a service media-item identifier from a different media service (e.g., "Service 2") that identifies the media item as provided by Service 2. That is, the request message may indicate that the media playback system 120 receives media from Service 1, but the media playback system 120 only has a Service 2 media-item identifier for the particular media item.

Upon receiving such a request message, the media system server 105 may attempt to locate a Service 1 media-item identifier that is associated with the Service 2 media-item identifier. This function may be performed in a variety of ways. In one implementation, the media system server 105 may search the received message table 111 for the particular Service 2 media-item identifier from the request message. If the media system server 105 locates a corresponding service media-item identifier entry 113, the media system server 105 may then access the common identifier entry 114.

If the common identifier entry 114 has a null value, the media system server 105 may, for example, return a media-item response message to the media playback system 120, perhaps indicating that the media system server 105 is unable to fulfill the request. On the other hand, if the common identifier entry 114 has a common identifier, the media system server 105 may locate the corresponding association entry 116 in the association table 115.

The media system server 105 may then determine if the association entry 116 includes a Service 1 media-item identifier. If so, the media system server 105 may transmit to the media playback system 120 the Service 1 media-item identifier, which may facilitate obtaining by the media playback system 120 the particular media item from Service 1. Aspects of these functions and aspects of the network configuration 100 are discussed in further detail below. It should be understood that the database 110 of FIG. 1B is but one example of a database that may be used to facilitate associating media-item identifiers. Other example databases and/or arrangements may be used as well.

III. Example Media Playback System

Figure 2:
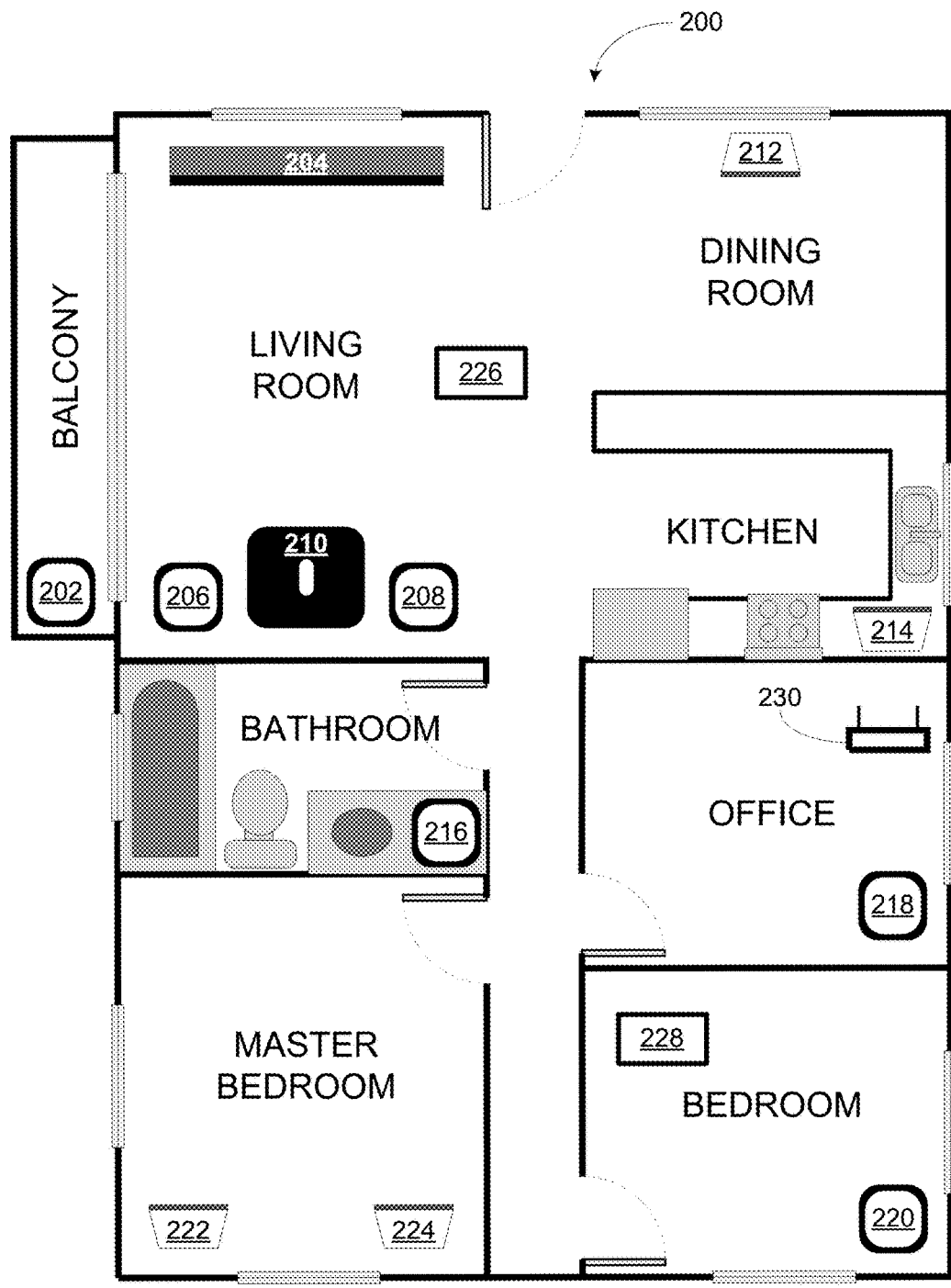
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
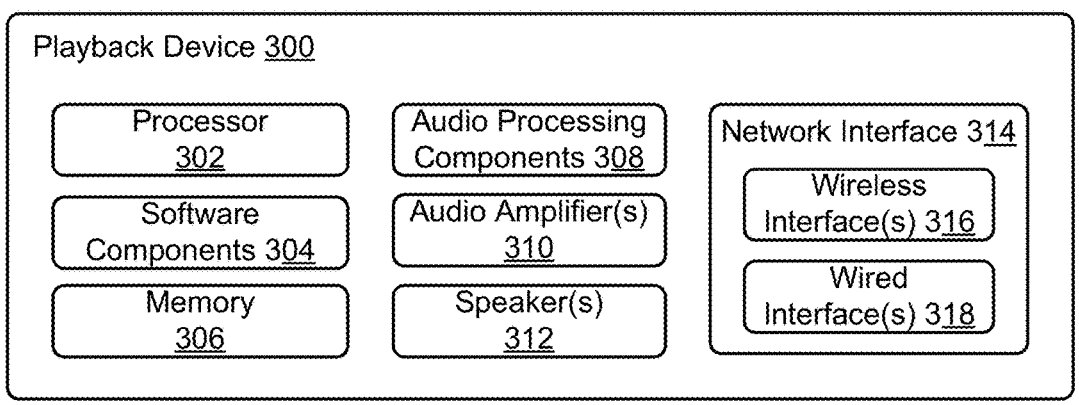
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
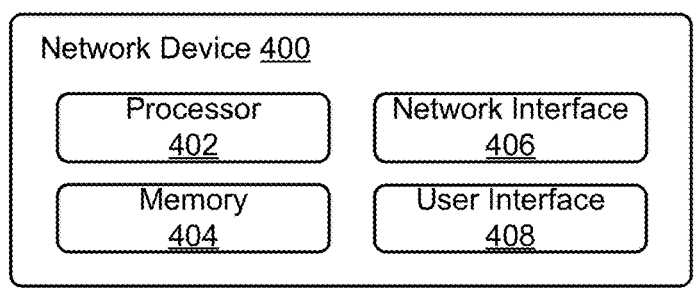
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200. In another example, the control device 400 may be a network device on which media playback system controller application software may be installed, such as for example, an iPhone™, iPad™ or any other smart phone, tablet or network device (e.g., a networked computer such as a PC or Mac™).

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
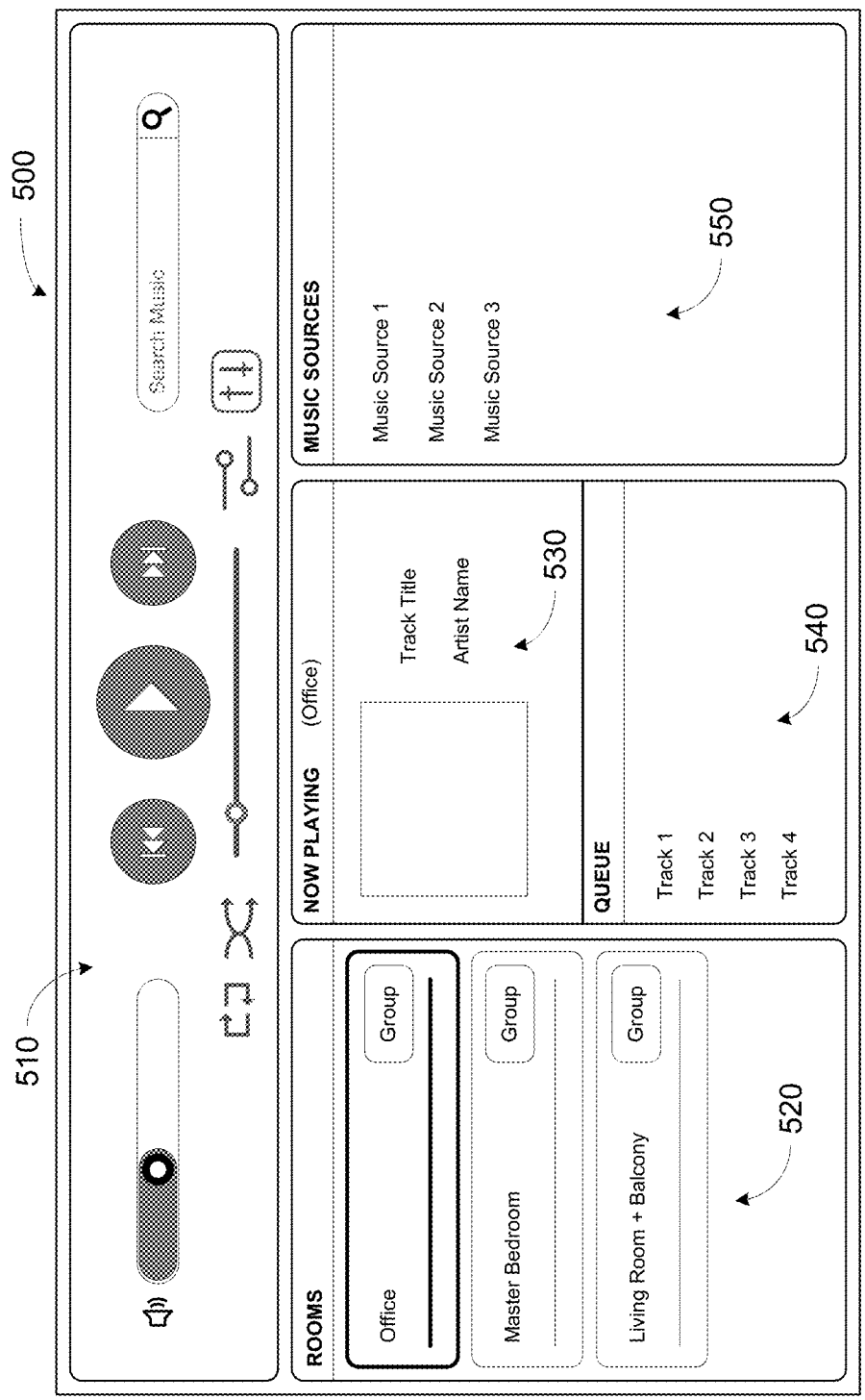
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Methods for Maintaining a Media-Item Database

As discussed above, in some situations, it may be desirable to maintain a media-item database that stores media-item information associated with various media services and that may be used to facilitate accessing, by a playback device, media items that the playback device may otherwise not be able to access.

Figure 6:
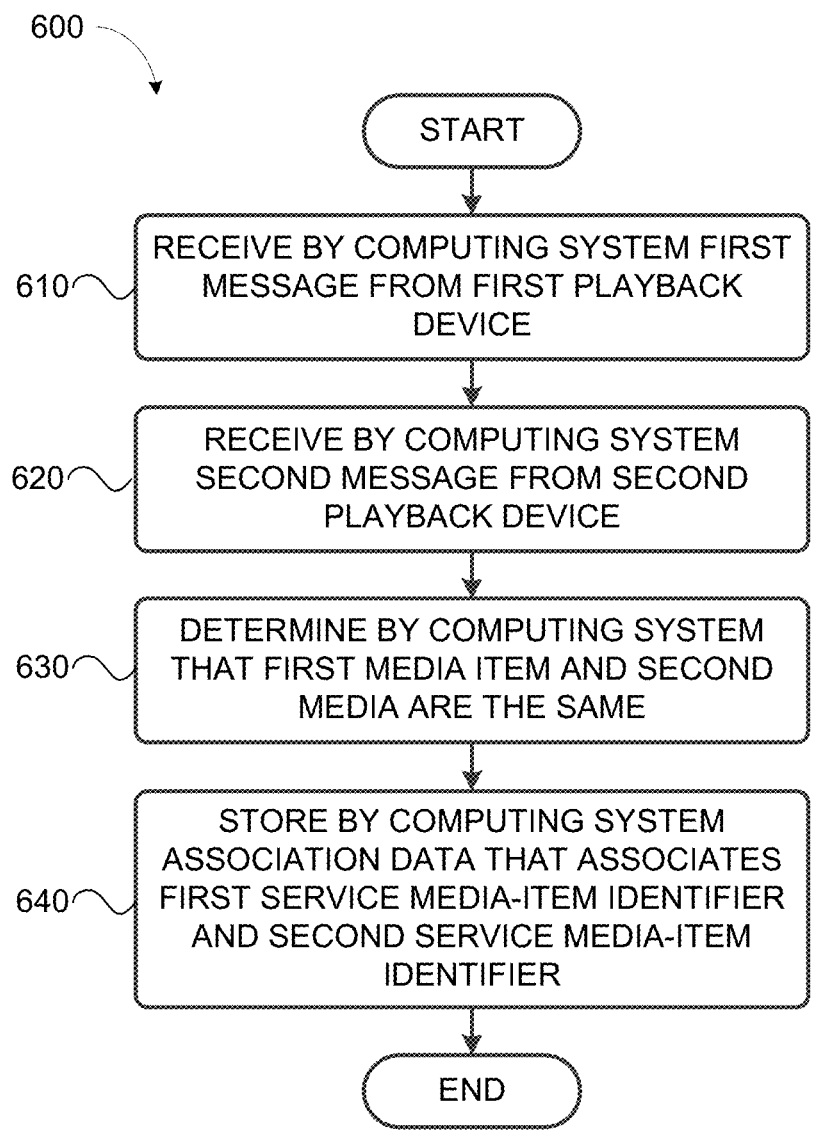
FIG. 6 shows an example flow diagram of an example method.

Method 600 shown in FIG. 6 presents an embodiment of a method that may be implemented within the network configuration 100 by the media system server 105. It should be understood that the method may be carried out on other suitable network configurations and/or by other suitable network elements as well. Method 600 may include one or more operations, functions, or actions as illustrated by one or more of blocks 610-640. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

For clarity, the method 600 is described herein with reference to FIG. 7 and FIGS. 8A-8E. It should be understood, however, that this is for purposes of example and explanation only and that the operations of method 600 are not limited by these figures.

The method 600 begins at block 610 with receiving by a computing system a first message from a first playback device, where the first message identifies at least (i) a first service used by the first playback device to obtain a first media item for playback, (ii) a first service media-item identifier used by the first service to identify the first media item, and (iii) a first metadata. At block 620, the method 600 involves receiving by the computing system a second message from a second playback device, where the second message identifies at least (i) a second service used by the second playback device to obtain the media item for playback, (ii) a second service media-item identifier used by the second service to identify a second media item, and (iii) a second metadata. At block 630, the method 600 involves determining by the computing system that the first media item and the second media item are the same. At block 640, the method 600 involves in response to the determination, storing by the computing system association data that associates the first service media-item identifier and the second service media-item identifier. Each of the blocks shown with respect to FIG. 6 is discussed further below.

a. Receiving First Message

The method 600 begins at block 610 with receiving by a computing system a first message from a first playback device, where the first message identifies at least (i) a first service used by the first playback device to obtain a first media item for playback, (ii) a first service media-item identifier used by the first service to identify the first media item, and (iii) a first metadata. Accordingly, the computing system may be configured to parse the payload of the first message and extract the respective information that identifies the first service, the first service media-item identifier, the first metadata, and/or other information.

In practice, the media system server 105 may receive the first message from, for example, a playback device (such as playback device 300) or a control device (such as control device 400) of the media playback system 120 via the cloud network 150. In example implementations, the media playback system 120 may transmit the first message to the media system server 105 while or after the media playback system 120 plays the first media item. In other examples, the media playback system 120 may transmit the first message to the media system server 105 before the media playback system 120 plays the first media item.

The first message may take numerous different forms. For example, the first message may take the form of "Streaming Service 1/Z.L.4.4./Led Zeppelin/Stairway to Heaven". In certain implementations, the first message may take the form of a sequence of messages. For example, the sequence of messages may include a message that identifies the first service used by the first playback device to obtain a first media item for playback, a message that identifies the first service media-item identifier used by the first service to identify the first media item, and one or more messages that identify the first metadata. In other examples, the sequence of messages may include a message that identifies the first service and the first service media-item identifier, and one or more message that identify the first metadata. Other different forms of the first message are also possible.

As noted above, the first message may identify information regarding a first media item that the playback device of the media playback system 120 obtained from (or at the direction of) a media service server 135-145. In particular, the first message may identify a first service (e.g., "Streaming Service 1" in the above example) used by the playback device to obtain the first media item for playback. Accordingly, the first message may include the name of the first service and/or an identifier unique to the first service that distinguishes the first service from other media services.

The first message may also identify a service media-item identifier (e.g., "Z.L.4.4." in the above example) used by the first service to identify the first media item. Hence, the first message may include an identifier (e.g., an alphabetic, a numeric, or an alphanumeric identifier, among other identifiers) that distinguishes the first media item of the first service from other media items of the first service. That is, a given media service may have a unique identification scheme used to identify a particular media item within a media library of the given media service.

Further, the first message may identify a first metadata of the first media item (e.g., "Led Zeppelin" and "Stairway to Heaven" in the above example). Generally speaking, the first metadata may include any information that is related to the first media item. In one implementation, at least a portion of the first metadata may have been sent to the playback device by the first service (e.g., the media service server 135) along with the first media item. Additionally or alternatively, at least a portion of the first metadata may have been created by the playback device (or a control device) or obtained by the playback device from another source. For example, the playback device may have created or used a third party application to create metadata, such as "audio fingerprint" data, of the first media item.

The first metadata may take various forms. For example, the first metadata could be in the form of textual data, numerical data, audio data, image data, video data, and "audio fingerprint" data (e.g., a digital summary of particular attributes of the media item, such as sound patterns), among other types of data. In particular, the first metadata may include: (i) a media-item name (e.g., a track name such as "Stairway to Heaven"), (ii) a media-item duration, (iii) an artist or band name (e.g., Led Zeppelin), (iv) an album name, (v) an album track number, (vi) album art, (vii) a genre, (viii) a date the media item was released, (ix) lyrics of the underlying content of the media item, (x) an audio clip related to the media item, (xi) a music video or other video related to the media item, (xii) a name of a record label, (xiii) copyright information, (xiv) a disc number, (xv) a number of beats per minute associated with the media item, (xvi) authorship or composer information, and/or other information related to the media item. Those skilled in the art will understand that the above list of possible metadata is not intended to be limiting, and that other metadata are possible in addition, or in the alternative, to those listed above.

Additionally, the first message may also include payload indicators for each respective piece of information included in the first message. The payload indicators may facilitate the computing system parsing the payload of the first message and extracting the respective information that identifies the first service, the first service media-item identifier, the first metadata, and/or other information. The payload indicators may take various forms. In one example, a payload indicator may include an alphabetic, a numeric, a symbolic, or an alphanumeric indicator. Additionally or alternatively, a payload indicator may include a position of the information within the first message (e.g., information in a first position may indicate a media service name). In example implementations, the first message may also include similar indicators for each respective piece of metadata. Other examples are possible as well.

Figure 7:
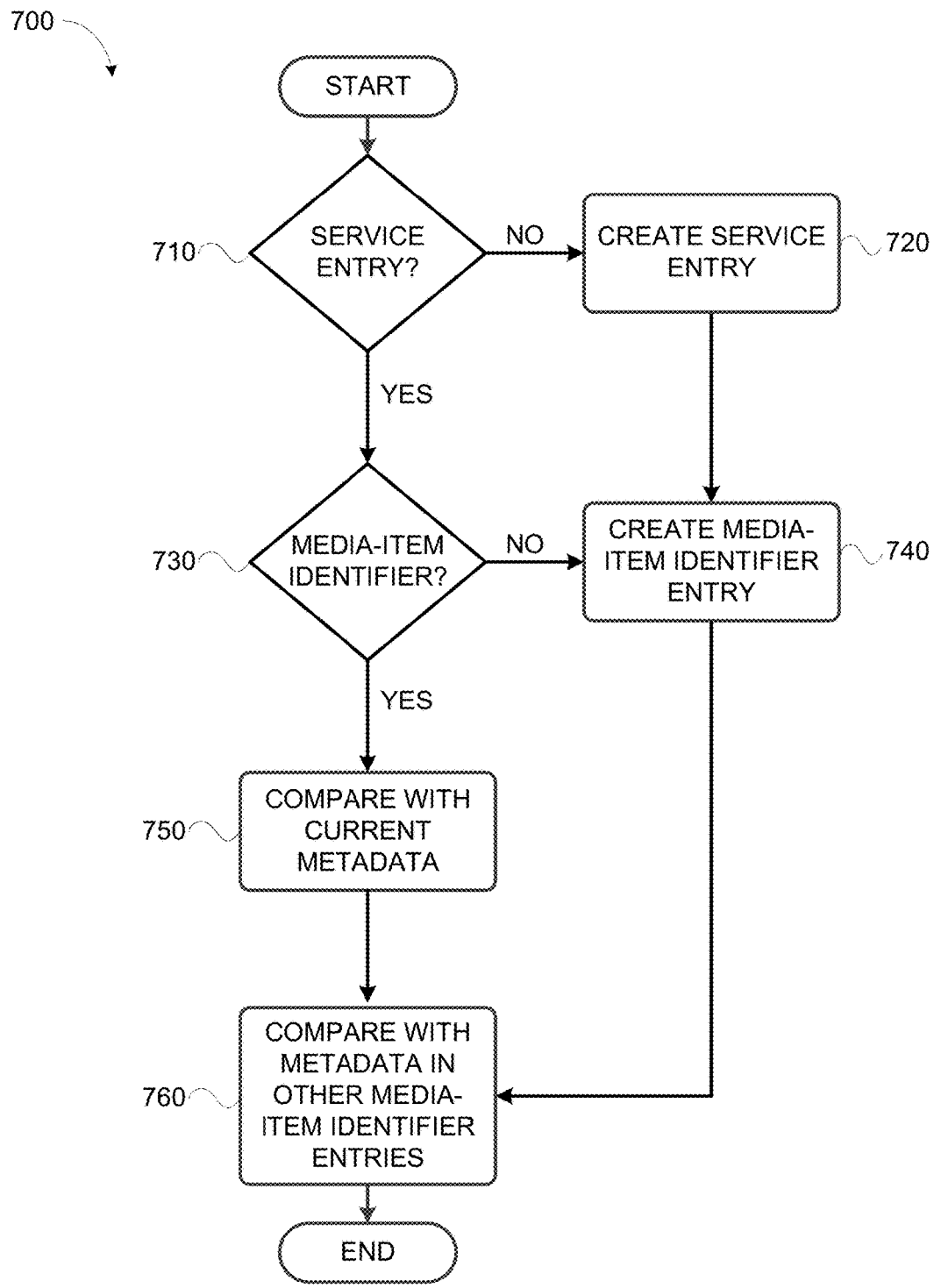
FIG. 7 shows an example flow diagram of aspects of the example method.

In practice, the media system server 105 may maintain a database that includes data from the messages that the media system server 105 receives from playback devices. This function may involve, for example, the media system server 105 storing some or all of the information from the first message in a database (e.g., the database 110). Referring now to FIG. 7, a flow chart 700 is shown that illustrates aspects of an example process that the media system server 105 may perform in connection with storing information from the first message in the database 110. It should be understood that the flow chart 700 is shown and described for purposes of example and explanation only and that there are various other ways by which a media system server may maintain a database. Furthermore, it should be understood that the processes described in connection with FIG. 7 are not necessarily part of the method 600.

The flow chart 700 may begin after the media system server 105 receives a message from a playback device, such as the first message from a playback device of the media playback system 120. With information from the first message, at block 710, the media system server 105 may determine whether the database 110 includes a service entry corresponding to the first service identified in the first message. In particular, the media system server 105 may search the received message table 111 for a service entry that includes the first service identified in the first message (e.g., Streaming Service 1 in the above example). If no such entry exists, at block 720, the media system server 105 may create a service entry for the first service in the received message table 111. The service entry for the first service may include the name or some other identifier of the first service. After creating the service entry, the process proceeds to block 740.

On the other hand, if the media system server 105 determines that the database 110 does include a service entry corresponding to the first service, at block 730, the media system server 105 may then determine whether the first service entry includes a service media-item identifier entry corresponding to the first service media-item identifier (e.g., Z.L.4.4. in the above example). That is, the media system server 105 may search within the first service entry for the first service media-item identifier identified in the first message.

If no such entry exists, at block 740, the media system server 105 may create a service media-item identifier entry for the first service media-item identifier. This entry may include an indication of the first service media-item identifier, the first metadata from the first message (e.g., Led Zeppelin and Stairway to Heaven in the above example), and a common identifier entry. Because this is a newly created service media-item identifier entry, the common identifier entry will have a null value indicating that this particular service media-item identifier is not yet associated with another service media-item identifier.

A service media-item identifier entry may include additional information as well. In one implementation, a service media-item identifier entry may include predetermined metadata entries (e.g., an entry for any of the example metadata described above) that may be populated with appropriate metadata from the received message. In another implementation, the media system server 105 may dynamically determine a classification for the metadata. For example, the media system server 105 may be configured to determine that a piece of metadata indicates an artist/band name, a media-item name/title, an album title, a genre, a media-item duration, etc. Accordingly, the service media-item identifier entry may include a classification indicator associated with each particular metadata that indicates the classification of the particular metadata. In any event, after creation of the service media-item identifier entry, the process proceeds to block 760.

Referring back to block 730, if the media system server 105 determines that the first service entry includes a service media-item identifier entry corresponding to the first service media-item identifier, at block 750, the media system server 105 may then compare the first metadata from the first message with the metadata currently included in the entry. The operations involved with the media system server 105 comparing metadata are discussed in further detail below with reference to block 620 of method 600. After the comparison, the media system server 105 may perform a variety of functions.

In one implementation, the media system server 105 may replace or update the current metadata with the first metadata when the comparison yields a discrepancy. For example, the current metadata may include artist name and album art one and the first metadata may include artist name and album art two. In one instance, the media system server 105 may update the entry to include artist name and album art two. In another implementation, the media system server 105 may supplement the current metadata with the first metadata. For example, continuing off of the above example, the media system server 105 may supplement the entry by including artist name, album art one, and album art two. The media system server 105 may perform other functions as well after the comparison with the current metadata.

At block 760, the media system server 105 may thereafter compare the first metadata with metadata in other media-item identifier entries of other services, if any exist, to determine if an association exists with another service media-item identifier. This process may be performed even after the media system server 105 traverses through blocks 710 and 730 because the updated or supplemented metadata may create an association with another service media-item identifier that was not indicated by the previous metadata. In the present example, the data from the first message is the only data in the database, and so the media system server 105 has no other entries to compare with and the process therefore ends (e.g., by returning to method 600).

For purposes of example and explanation, FIG. 8A provides an example illustration of aspects of the database 110 at a first point in time (e.g., after a first iteration of the flow chart 700). Continuing off of the above example, the media system server 105 may have created the illustrated database entry in response to receiving the first message that identified "Streaming Service 1/Z.L..4.4./Led Zeppelin/Stairway to Heaven".

As depicted, the database 110 includes the received message table 111 with a service entry 812 corresponding to the first service, Streaming Service 1. The service entry 812 in turn includes a service media-item identifier entry 813 corresponding to the first service media-item identifier, Z.L.4.4., used by Streaming Service 1 to identify the first media item. The service media-item identifier entry 813 includes a common identifier entry 814 with a null value and the first metadata, Led Zeppelin (e.g., band name) and Stairway to Heaven (e.g., track title). The database 110 also includes the association table 115 that is illustrated as being empty because the service entry 812 is the only service entry in the received message table 111 (and thus no association exists).

b. Receiving Second Message

Returning to FIG. 6, at block 620, the method 600 involves receiving by the computing system a second message from a second playback device, where the second message identifies at least (i) a second service used by the second playback device to obtain a second media item for playback, (ii) a second service media-item identifier used by the second service to identify the second media item, and (iii) a second metadata. In practice, the media system server 105 may receive the second message from, for example, a playback device of the media playback system 125 via the cloud network 150. In other implementations, the media system server 105 may receive the second message from the same playback device that transmitted the first message or from a different playback device of the same media playback system that transmitted the first message.

In example implementations, the media system server 105 receiving the second message may be independent of the media system server 105 receiving first message. For example, a first playback device may transmit the first message as a result of a first user playing back the first media item in California, and a second playback device may simultaneously or at some later time transmit the second message as a result of a second user playing back the second media item in Illinois.

Alternatively, the media system server 105 receiving the second message may be dependent on the media system server 105 receiving the first message. For example, a first playback device may transmit the first message to the media system server 105 and may also transmit a media-item recommendation message to a second playback device. The media-item recommendation message may include all or some of the information from the first message. Based on receiving the recommendation message, the second playback device may transmit the second message to the media system server 105. In other examples, the second playback device may transmit a portion of the information from the second message to the media system server 105.

After receiving the second message, the media system server 105 may perform operations similar, in at least some respects, to those described above with respect to block 610 of method 600. For example, after the media system server 105 receives the second message, the media system server 105 may maintain the database 110 by storing the second message in accordance with the flow chart 700 as discussed above. However, at block 760, because the database 110 includes the data from the first message, the media system server 105 may compare the second metadata from the second message with the metadata in the first service media-item identifier entry stored in the received message table 111. This comparison may be performed in various manners.

In one implementation, the media system server 105 may compare each piece of metadata included in the second metadata individually with the metadata in the first service media-item identifier entry. For example, when the second metadata includes two pieces of metadata, the media system server 105 may compare the first piece of metadata with the metadata in the first service media-item identifier entry and afterwards do the same for the second piece of metadata. In practice, the media system server 105 may first perform some form of a search and then perform the comparison between the second metadata and the search results. In any event, the media system server 105 may keep a record of any matches that are found regardless of how the comparison is performed.

The media system server 105 may perform the search and comparison in a variety of manners. For instance, in an implementation that includes predetermined metadata entries, the media system server 105 may first search for metadata entries that are applicable to the piece of metadata of the second metadata and then compare the piece of metadata to the metadata found in such entries. For example, the media system server 105 may have stored a piece of metadata of the second metadata in an album name entry, and thus the media system server 105 may only compare that piece of metadata to metadata found in other album name entries. Additionally or alternatively, in an implementation that involves the media system server 105 classifying each piece of metadata, the media system server 105 may first search by a particular classification indicator and then compare the piece of metadata with any metadata with that particular classification indicator.

Furthermore, the manner by which the search and comparison are performed may depend on the type of metadata included in the second message. For instance, when the second metadata includes textual data, the media system server 105 may compare the textual data by performing, for example, an exact string search or a "fuzzy" string search. For example, if the second metadata includes the string "Stairway to Heaven," the media system server 105 may search for that exact string or any strings that are approximate to "Stairway to Heaven" (e.g., the search results may include "Stairs to Heaven", "Stairway to the Heavens", etc.). In another instance, the media system server 105 may search for a keyword from the string "Stairway to Heaven," such as "Stairway" or "Heaven", and the media system server 105 may perform such a keyword search more than once with different keywords.

In yet other examples where the second metadata includes textual data, the media system server 105 may perform an alias or alternative text search to resolve variations in, for example, artist names. That is, the media system server 105 may be configured to search for known aliases or alternative names of an artist to attempt to match metadata from the second message. Other examples are also possible.

In another example, when the second metadata includes numerical data, the media system server 105 may search for numerical values and make a comparison with any search results by, for example, calculating the difference between the two numerical values. For example, if the second metadata includes numerical data that indicates that the media item is 3 minutes and 35 seconds long and a search returns metadata that indicates a duration of 3 minutes and 33 seconds, the media system server 105 may calculate a 2 second difference and make a record of such difference. Other examples are also possible.

In other instances, when the second metadata includes image data (or a still image from video data), the media system server 105 may perform the search and comparison using one or more image matching techniques. For example, the media system server 105 may perform object recognition, pattern matching, and/or color matching, among other image matching techniques.

In other examples, when the second metadata includes audio data or video data, the media system server may search for an exact or approximate audio/video match. Additionally or alternatively, when the media system server 105 locates audio/video data stored in the database, the media system server 105 may search within such data with a sample of the audio/video data from the second metadata. The media system server 105 may perform other audio/video matching techniques as well.

In yet other examples, when the second metadata includes "audio fingerprint" data, the media system server 105 may search for an exact match or an approximate match. For example, the media system server 105 may compare a sample of the "audio fingerprint" data from the second metadata with other "audio fingerprint" data found while performing a search or the media system server 105 may compare the whole "audio fingerprint" data from the second metadata with the found "audio fingerprint" data. Other examples are also possible.

Those skilled in the art will understand that the above examples of metadata search and comparison techniques are not intended to be limiting, and that other such techniques are possible in addition, or in the alternative, to those listed above.

Referring now to FIG. 8B, an example illustration of aspects of the database 110 at a second point in time is shown (e.g., after a second iteration of the flow chart 700). In this example, the second message may have taken the form of "Streaming Service 2/4.S.H.1971./Stairway to Heaven/8:02/1971".

As shown, the database 110 includes the received message table 111 with the service entry 812 from the first point in time as shown in FIG. 8A and a service entry 822 corresponding to the second service, Streaming Service 2. The service entry 822 includes a service media-item identifier entry 823 corresponding to the second service media-item identifier, 4.S.H.1971., used by Streaming Service 2 to identify the media item. The service media-item identifier entry 823 in turn includes a common identifier entry 824 with a null value and the second metadata, Stairway to Heaven (e.g., track title), 8:02 (e.g., track duration of 8 minutes and 2 seconds), and 1971 (e.g., date the media item was released). The association table 115 remains empty as the media system server 105 has yet to determine that there is an association between the first and second media-item identifiers.

c. Determining that First Service Media-Item Identifier and Second Media-Item Identifier Identify the Same Media Item Returning to FIG. 6, at block 630, the method 600 involves determining by the computing system that the first media item and the second media item are the same. That is, the media system server 105 may infer that the first media item and the second media include the same or substantially the same underlying media content. This function may be performed in a number of ways.

In one implementation, this function may involve the media system server 105 using one or more of the search and comparison techniques discussed above to determine that the first metadata is substantially the same as the second metadata. That is, the first metadata and the second metadata may each include one or more pieces of metadata that are the same or similar. The first metadata and second metadata may be considered substantially similar in a number of ways.

In one example, the media system server 105 may programmatically conclude that the first metadata and the second metadata are substantially similar when they share at least one piece of metadata that is substantially similar (e.g., a common track title). In another example, such a conclusion may require that the first metadata and the second metadata share more than one piece of metadata that is substantially similar (e.g., a common track title and band name).

In other examples, the number of required pieces of substantially similar metadata may depend on the type of metadata that is shared. In such an example, a uniqueness value or the like may be assigned to a class of metadata (e.g., a media-item title may be considered more unique than a genre) and may be used by the media system server 105 to determine whether the two metadata correspond to the same media item.

For instance, if the first metadata included band name: Led Zeppelin and media-item title: Stairway to Heaven and the second metadata included media-item title: Stairway to Heaven and album title: Led Zeppelin IV, then the media system server 105 may conclude that first media item and the second media item are the same based on sharing one unique piece of metadata, the media-item title. Similarly, if the first metadata included band name: Led Zeppelin, album title: Led Zeppelin IV, and track duration: 8:02, and the second metadata included album title: Led Zeppelin IV, track duration: 8:02, and genre: classic rock, then the media system server 105 may conclude that the first and second media items are the same based on sharing two moderately unique pieces of metadata, the album title and the track duration. On the other hand, if the first metadata included band name: Led Zeppelin, album title: Led Zeppelin IV, and genre: classic rock and the second metadata included band name: Led Zeppelin, album title: Led Zeppelin IV, and track duration: 8:02, then the media system server 105 may conclude that there is not enough information to determine that the first and second media items are the same based on sharing a moderately and a minimally unique piece of metadata, the album title and the band name, respectively. Other examples are certainly possible.

In example implementations, the media system server 105 determining that the first media item and the second media item are the same may involve the media system server 105 generating a match score. In general, a higher match score indicates a higher probability that the first media item and the second media item are the same. The match score may be based on the quantity or type of metadata matches found. Further, certain types of metadata matches may be weighted differently than other types of metadata matches. For example, an exact match of an "audio fingerprint" data may result in a very high score on a highly weighted match, while an approximate match of the same type of metadata may result in a very high score on a mid-weighted match. Other examples are also possible.

Additionally or alternatively, determining that the first media item and the second media item are the same may involve an evaluation of the certainty of the comparison, such as whether the comparison involved an exact searching technique or a fuzzy searching technique. Based on the evaluation, the media system server 105 may then set a number of matches that must be met before it concludes that the first and second metadata are substantially similar. For example, the number of required pieces of shared metadata may be less when exact searching techniques are used than when fuzzy searching techniques are used. Other examples are also possible.

d. Storing Association Data

Referring back to FIG. 6, at block 640, the method 600 involves in response to the determination, storing by the computing system association data that associates the first service media-item identifier and the second service media-item identifier. This function may be performed in a number of ways.

Broadly speaking, the association data may be any data that maps the first service media-item identifier entry to the second service media-item identifier entry. In one example, the association data may take the form of a common identifier that is generated by the media system server 105 as discussed above. In such an example, the media system server 105 may store a common identifier in the common identifier entry of each of the first and second media-item identifier entries. The media system server 105 may also create an association entry in the association table 115 corresponding to the common identifier. Such an association entry may include two or more service media-item identifiers (e.g., the first and second service media-item identifiers) and may also include metadata from the service media-item identifier entries that correspond to the two or more service media-item identifiers.

Figure 8C:
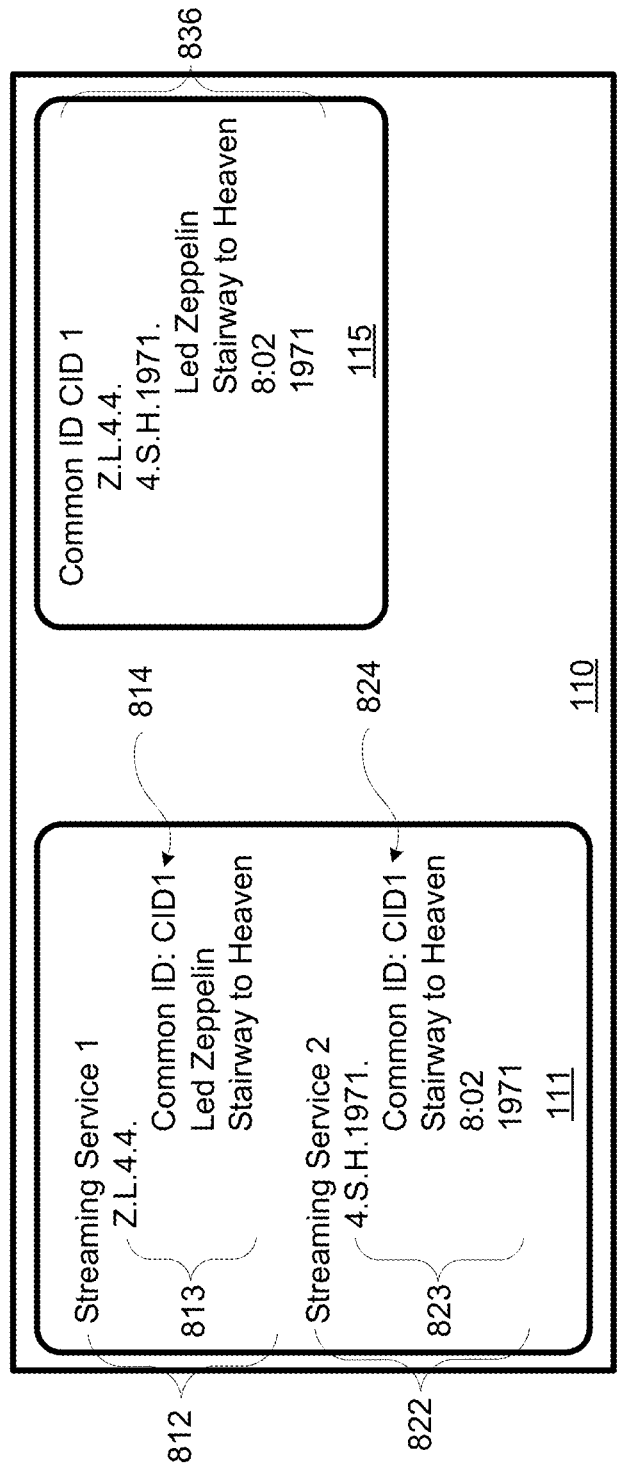

For example, referring now to FIG. 8C, an example illustration of aspects of the database 110 at a third point in time is shown (e.g., after storing the association data). As depicted, the database 110 includes the received message table 111 with the service entry 812 and the service entry 822 from the second point in time, but the common identifier entries 814, 824 now include common identifier CID1. Accordingly, the media system server 105 may have created an association entry 836 in the association table 115. As shown, the association entry 836 includes an indication of the common identifier CID1, the associated service media-item identifiers (Z.L.4.4. and 4.S.H.1971), and metadata from the service media-item identifier entries 813, 823 that are associated via the common identifier.

In this way, the media system server 105 stores the first service media-item identifier, the second service media-item identifier, and the common identifier, such that the first service media-item identifier and the second service media-item identifier are each associated with the common identifier. Further, the media system server 105 stores at least a portion of the first metadata and at least a portion of the second metadata, such that the portions of the first metadata and second metadata are also associated with the common identifier. Accordingly, the method 600 may provide for using crowd-sourcing (e.g., multiple users playing media items at respective playback devices) to construct a database that may be used to facilitate accessing, by a given playback device, media items that the given playback device may otherwise not be able to access.

e. Additional Functions

Although not shown in FIG. 6, additional functions may be carried out with or in addition to method 600. In one implementation, such a function may involve receiving by the computing system a third message from a third playback device, where the third message identifies at least (i) a third service used by the third playback device to obtain a third media item for playback, (ii) a third service media item identifier used by the third service to identify the third media item, and (iii) a third metadata. For example, the media system server 105 may receive the third message from a playback device of the media playback system 130 or possibly a different playback device of the same media playback system that transmitted the first and/or second message.

Figure 8D:
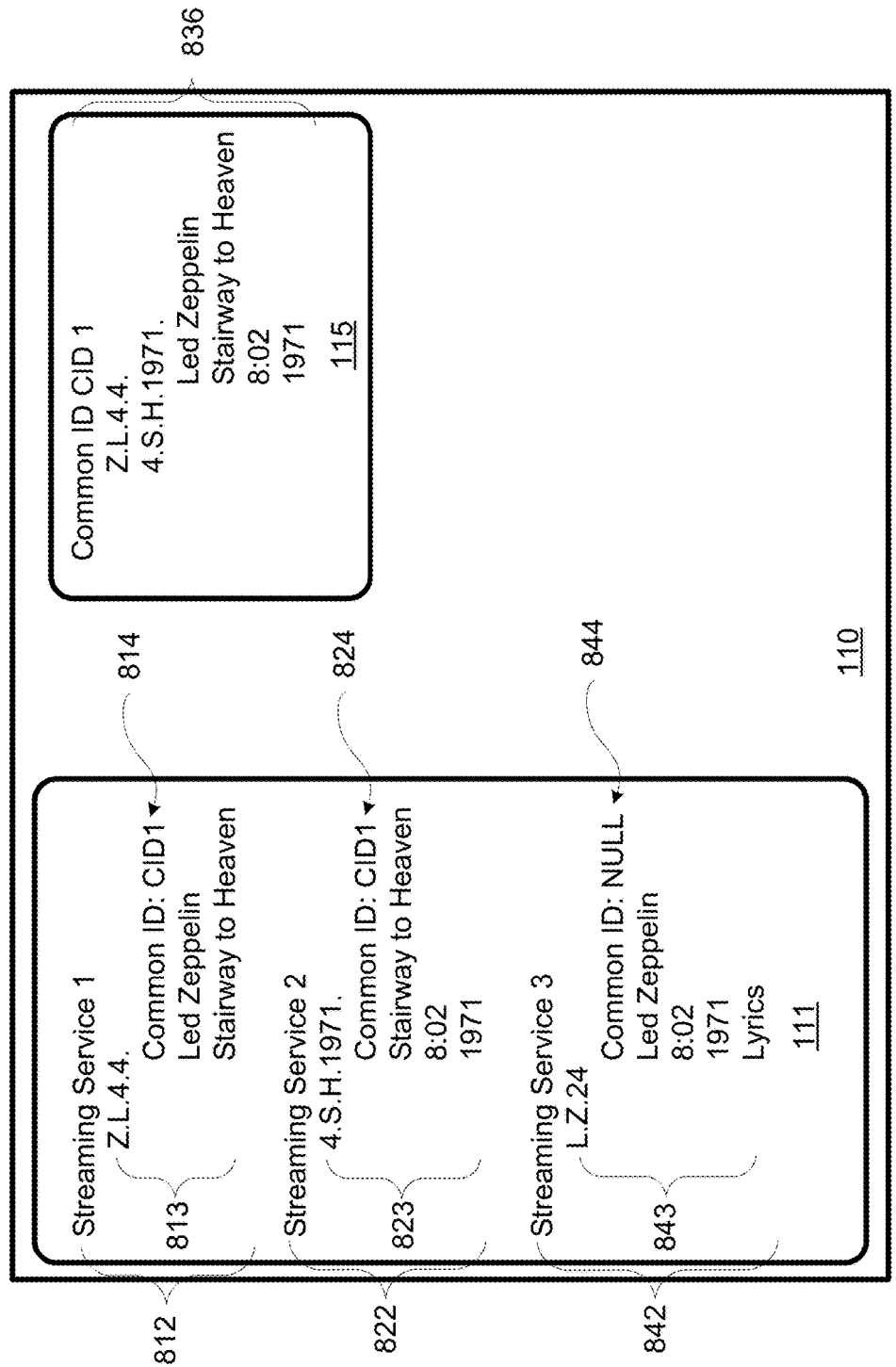

After receiving the third message (and any other subsequent messages), the media system server 105 may perform operations similar, at least in some respects, to those described above with respect to block 620 of FIG. 6. For purpose of illustration, FIG. 8D depicts aspects of the database 110 at a fourth point in time (e.g., after the media system server 105 performs such operations). In this example, the third message identified "Streaming Service 3/L.Z.24/8:02/1971/Lyrics". As shown, the database 110 includes an additional service entry 842 corresponding to the third service, Streaming Service 3. The service entry 842 includes a service media-item identifier entry 843 corresponding to the third service media-item identifier, L.Z.24, used by Streaming Service 3 to identify the media item. The service media-item identifier entry 843 in turn includes a common identifier entry 844 with a null value and the third metadata that includes Led Zeppelin (e.g., band name), 8:02 (e.g., track duration), 1971 (e.g., date the media item was released), and lyrics of the media item (although not shown, the service media-item identifier entry may include the complete set of lyrics for this particular media item).

Continuing with the above implementation, an additional function may involve determining by the computing system that the first media item and the third media item are the same (or that the second media item and the third media item are the same). This function may be performed in a similar manner as described above with respect to block 630 of FIG. 6. Additionally or alternatively, this function may be performed by comparing the third metadata with the metadata in the association entries of the association table 115. For example, the media system server 105 may compare each piece of metadata from the third message with the metadata in the association entry 836. Other examples are also possible.

In any event, in response to the determination that the first and third media items are the same, the present implementation may also involve storing by the computing system second association data that associates the third service media item identifier with the first service media-item identifier and the second service media-item identifier. This function may be performed, at least in some respects, in line with the above discussion with respect to block 640 of FIG. 6.

Figure 8E:
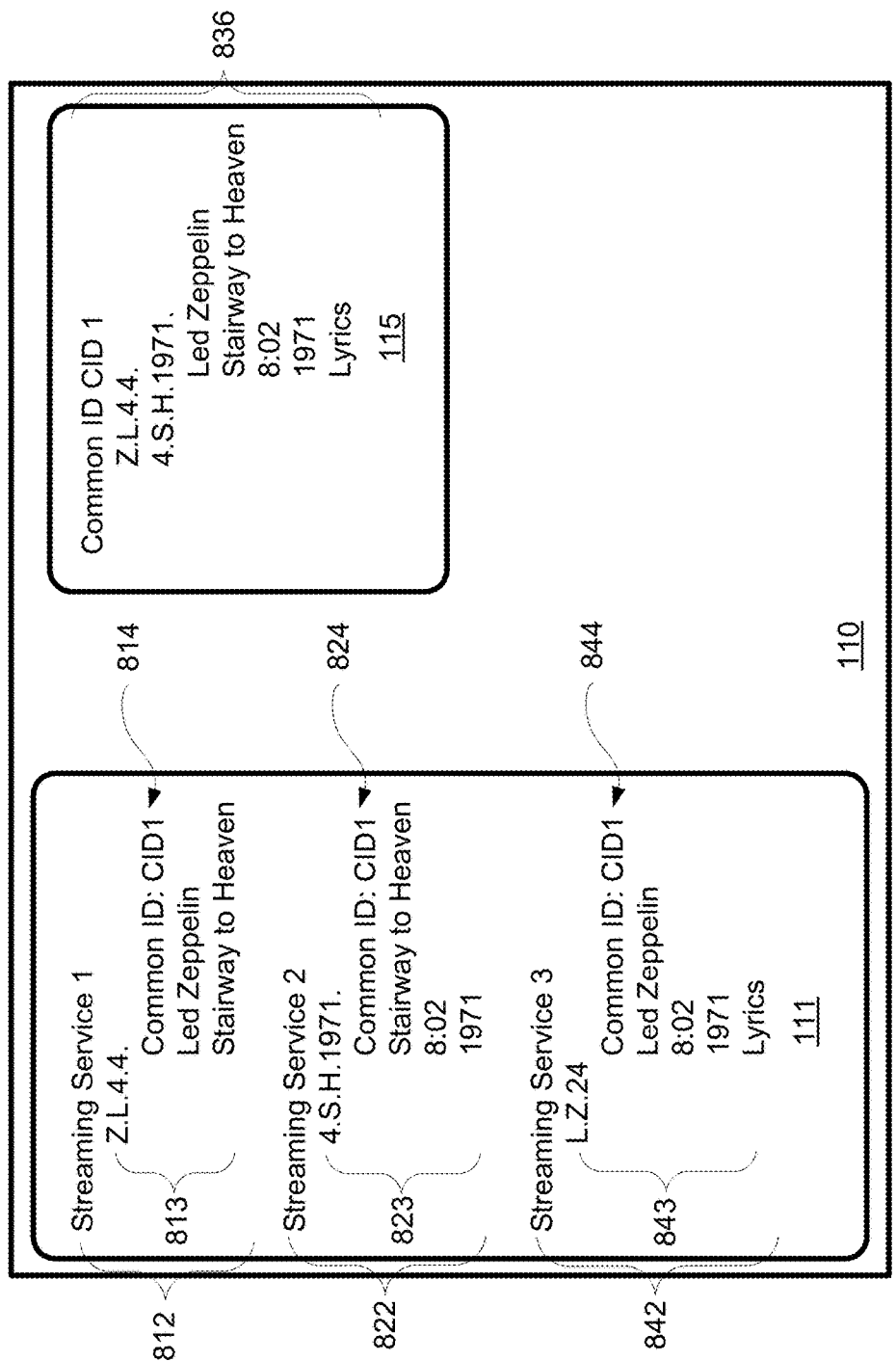

FIG. 8E depicts aspects of the database 110 at a fifth point in time (e.g., after the media system server 105 performs this function). As depicted, the database 110 includes the received message table 111 as it was shown in FIG. 8D, but now the common identifier entry 844 is shown with the common identifier value of CID1. Additionally, the association table 115 is shown with the association entry 836 now including the lyrics from the third metadata. In this way, the media system server 105 stores the first service media-item identifier, the second service media-item identifier, the third service media-item identifier, and the common identifier, such that the first service media-item identifier, the second service media-item identifier, and the third service media-item identifier are each associated with the common identifier. Further, the media system server 105 stores at least a portion of the third metadata, such that the third metadata is associated with the common identifier.

In another implementation, an additional function may involve, after receiving a message from a playback device, the computing system chronologically storing an indication of the media item associated with the message as the computing system receives messages. For example, the media system server 105 may store one or more pieces of metadata associated with the media item in a table or the like in the database 110. This function may also involve the media system server 105 storing a time stamp along with the indication. In this way, the media system server 105 may store a searchable list of media items that a user has played at one or more playback devices. The media system server 105 may provide the user (e.g., via a web interface) the ability to browse and interact with the list, such as by adding a media item from the list to a playlist of the user's playback device or to a playlist of another user's playback device. Other examples are also possible.

In example implementations, an additional function may involve generating "fingerprint" data of known media items as they are being played by a playback device and storing such data in a database, such as the database 110. In such implementations, the media system server 105, a playback device, and/or a control device may generate the "fingerprint" data. Generating "fingerprint" data may involve determining one or more characteristics (e.g., sound patterns) of the media item. This data may be used by the media system server 105 to perform a future metadata search and comparison. Other additional functions are possible as well.

V. Method for Facilitating Access to Media Items

As discussed above, in some situations, it may be desirable to utilize the crowd-sourced database described herein to facilitate accessing, by a playback device, media items that the playback device may otherwise not be able to access.

Figure 9:
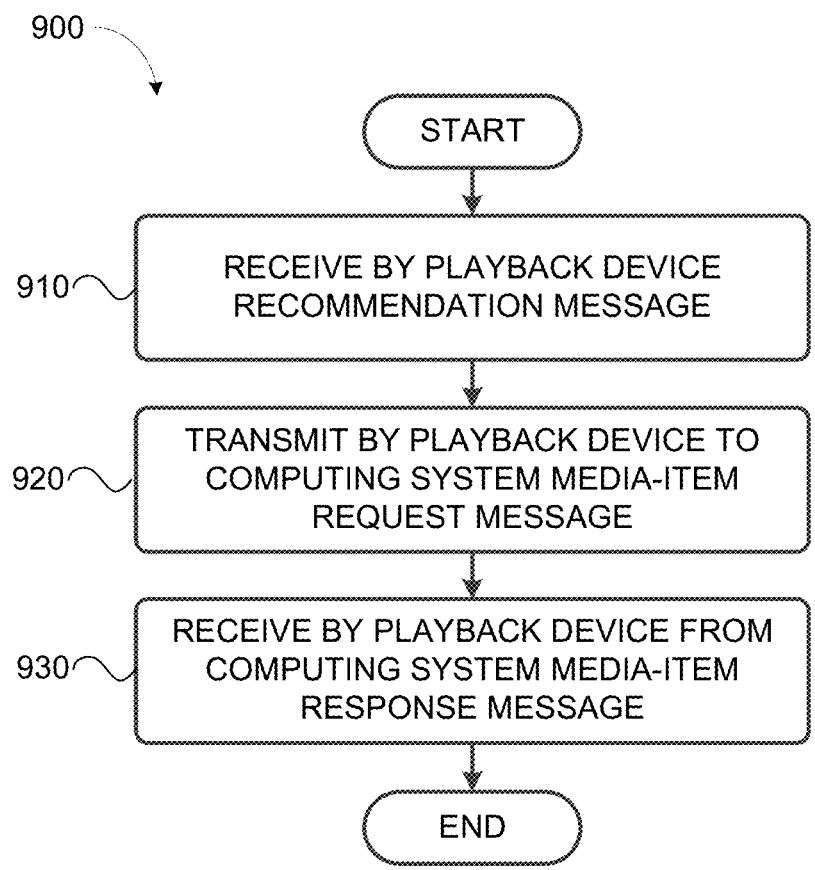
FIG. 9 shows an example flow diagram of another example method.

Method 900 shown in FIG. 9 presents an embodiment of a method that may be implemented within the network configuration 100 by any of the media playback systems 120-130. Such a method may be performed concurrent with or after the construction of the crowd-sourced database described herein. In particular, the method 900 may be carried out by a playback device (e.g., the playback device 300) or a control device (e.g., the control device 400) of one of the media playback systems 120-130. For simplicity, the method 900 is discussed below as being carried out by a playback device but this should not be construed as limiting. Method 900 may include one or more operations, functions, or actions as illustrated by one or more of blocks 910-930. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

The method 900 begins at block 910 with a playback device receiving a recommendation message that identifies at least (i) a first service that does not provide media to the playback device and (ii) a first service media-item identifier used by the first service to identify a media item. For example, a playback device of the media playback system 120 may receive from the media playback system 125 a recommendation message that identifies Streaming Service 1 and Z.L.4.4. In particular, a first user may use the media playback system 125 to receive media from Streaming Service 1, and the first user may wish to suggest to a second user that the second user should listen to a particular media item (e.g., the media item identified by Z.L.4.4.) that the first user listened to using Streaming Service 1. Accordingly, the first user may use, for example, a control device or playback device of the media playback system 125 to send the recommendation message to the second user via the playback device of the media playback system 120. However, the playback device of the media playback system 120 may not be able to receive media from Streaming Service 1 (e.g., the playback device may not have an account setup with that service), and at this point, the second user may not be able to listen to the recommended media item.

Consequently, at block 920, the method 900 involves the playback device transmitting to a computing system (e.g., the media system server 105) a media-item request message that identifies at least (i) a second service used by the playback device to obtain media for playback and (ii) the first service media-item identifier. For example, the playback device of the media playback system 120 may transmit to the media system server 105 a media-item request message that identifies Streaming Service 2 and Z.L.4.4.

The media system sever 105 may receive the media-item request message, parse the payload, and identify that Z.L.4.4. is a media-item identifier of Streaming Service 1. The media system server 105 may then determine whether the Z.L.4.4. media-item identifier is associated with any other service media-item identifiers. This function may be performed in a variety of ways.

In example implementations, the media system server 105 may search the received message table 111 of FIG. 8E for Z.L.4.4. When the media system server 105 locates the corresponding media-item identifier entry 813, the media system server 105 may then access the common identifier entry 814. Upon determining that the common identifier entry 114 has a common identifier, the media system server 105 may locate the corresponding association entry 836 in the association table 115. The media system server 105 may then determine if the association entry 836 includes a Streaming Service 2 media-item identifier. Upon such a determination, the media system server 105 may transmit to the playback device the corresponding media-item identifier (e.g., 4.S.H.1971.), for example, in a media-item response message.

In turn, at block 930, the method 900 involves the playback device receiving a media-item response message that identifies at least a second service media-item identifier used by the second service to identify the media item. Continuing with the above example, the playback device may receive from the media system server a media-item response message that identifies 4.S.H.1971. Subsequently, the playback device may then use this media-item identifier to obtain from Streaming Service 2 the recommended media item.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As discussed above, the examples provided herein relate to maintaining a media-item database. In one aspect, a method is provided. The method involves (a) receiving by a computing system a first message from a first playback device, where the first message identifies at least (i) a first service used by the first playback device to obtain a first media item for playback, (ii) a first service media-item identifier used by the first service to identify the first media item, and (iii) a first metadata, (b) receiving by the computing system a second message from a second playback device, where the second message identifies at least (i) a second service used by the second playback device to obtain a second media item for playback, (ii) a second service media-item identifier used by the second service to identify the second media item, and (iii) a second metadata, (c) determining by the computing system that the first media item and the second media item are the same, and (d) in response to the determination, storing by the computing system association data that associates the first service media-item identifier and the second service media-item identifier.

In another aspect, a non-transitory computer readable medium is provided. The non-transitory computer readable having instructions stored thereon that are executable by at least one processor. The instructions include instructions for (a) receiving by a computing system a first message from a first playback device, where the first message identifies at least (i) a first service used by the first playback device to obtain a first media item for playback, (ii) a first service media-item identifier used by the first service to identify the first media item, and (iii) a first metadata, (b) receiving by the computing system a second message from a second playback device, where the second message identifies at least (i) a second service used by the second playback device to obtain a second media item for playback, (ii) a second service media-item identifier used by the second service to identify the second media item, and (iii) a second metadata, (c) determining by the computing system that the first media item and the second media item are the same, and (d) in response to the determination, storing by the computing system association data that associates the first service media item identifier and the second service media-item identifier.

In an example aspect, a computing system is provided. The computing system includes a network interface, where the network interface communicatively couples the computing system to one or more playback devices. The computing system also includes a non-transitory computer readable medium and program instructions stored on the non-transitory computer readable medium. The program instructions are executable by at least one processor to cause the computing system to (a) receive a first message from a first playback device, where the first message identifies at least (i) a first service used by the first playback device to obtain a first media item for playback, (ii) a first service media-item identifier used by the first service to identify the first media item, and (iii) a first metadata, (b) receive a second message from a second playback device, where the second message identifies at least (i) a second service used by the second playback device to obtain a second media item for playback, (ii) a second service media-item identifier used by the second service to identify the second media item, and (iii) a second metadata, (c) determine that the first media item and the second media item are the same, and (d) in response to the determination, store association data that associates the first service media item identifier and the second service media-item identifier.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A system comprising:
a media playback system comprising a control device and a playback device connected via a local area network, the playback device comprising a hardware processor and a network interface, the playback device configured to:
receive, via the network interface of the playback device from the control device, an instruction to queue a first uniform resource identifier (URI) of a particular audio track in a queue on the playback device for playback via one or more speakers of the playback device, the first URI representing a first source of the particular audio track at a server of a first streaming audio service;
determine that the media playback system does not have at least one registered account with the first streaming audio service, wherein a registered account with the first streaming audio service permits the playback device to stream the particular audio track from the server of the first streaming audio service;
in response to determining that the media playback system does not have at least one registered account with the first streaming audio service, sending, via the network interface to a cloud computing system, a request for one or more respective second sources of the particular audio track at one or more second streaming audio services, wherein the media playback system has respective registered accounts with the one or more second streaming audio services, the request indicating the first URI of the particular audio track;
one or more servers of the cloud computing system, the one or more servers of the cloud computing system connected to the playback device via a wide area network and configured to:
receive, via a network interface of the one or more servers of the cloud computing system from the playback device, the request for one or more respective second sources of the particular audio track at the one or more second streaming audios services;
in response to receiving the request for one or more respective second sources of the particular audio track at the one or more second streaming audio services, querying a media-item database for second URIs corresponding to the first URI, the second URIs representing respective second sources of the particular audio track at respective servers of the one or more second streaming audio services; and
causing the playback device to play back the particular audio track from a particular second source of the particular audio track at one or more servers of a given second streaming audio service by transmitting, via the network interface of the one or more servers of the cloud computing system to the playback device, a given second URI representing the particular second source of the particular audio track at the one or more servers of the given second streaming audio service.

2. The system of claim 1, wherein querying the media-item database for second URIs corresponding to the first URI comprises:
querying the media-item database for a particular global identifier corresponding to the first URI, the particular global identifier unique to the particular audio track within the media-item database; and
retrieving, from the query, second URIs corresponding to the particular global identifier.

3. The system of claim 1, wherein querying the media-item database for second URIs corresponding to the first URI comprises:
receiving, via the network interface of the one or more servers of the cloud computing system, metadata of the particular audio track;
querying the media-item database for audio tracks having metadata that matches the metadata of the particular audio track; and
retrieving, from the query, the second URIs corresponding to the first URI.

4. The system of claim 3, wherein querying the media-item database for audio tracks having metadata that matches metadata of the particular audio track comprises determining that the audio tracks having metadata that matches metadata of the particular audio track have metadata matching at least an artist name and a track title of the particular audio track.

5. The system of claim 1, wherein causing the playback device to play back the particular audio track from the particular second source of the particular audio track at one or more servers of a given second streaming audio service comprises causing the playback device to play back the particular audio track by playing back an Internet radio station based on the particular audio track.

6. The system of claim 1, wherein causing the playback device to play back the particular audio track from the particular second source of the particular audio track at one or more servers of the given second streaming audio service comprises transmitting, via the network interface of the one or more servers of the cloud computing system to the playback device, multiple second URIs representing the respective second sources of the particular audio track at respective servers of the one or more second streaming audio services, and wherein the control device is configured to:
display, within a controller interface of the media playback system, a list of the second sources of the particular audio track;
receive, via the controller interface of the media playback system, input data indicating a selection of the particular second source of the particular audio track at the one or more servers of the given second streaming audio service; and
transmit, via a network interface to the playback device, an instruction that causes the playback device to queue the given second URI for playback.

7. The system of claim 1, wherein each source represented by a URI is a respective network location at which a respective audio track is hosted.

8. A method to be performed by a system comprising (i) a media playback system comprising a control device and a playback device connected via a local area network and (ii) one or more servers of a cloud computing system, the one or more servers connected to the playback device via a wide area network, the method comprising:
receiving, via a network interface of the playback device from the control device, an instruction to queue a first uniform resource identifier (URI) of a particular audio track in a queue on the playback device for playback via one or more speakers of the playback device, the first URI representing a first source of the particular audio track at a server of a first streaming audio service;
determining, via one or more processors of the playback device, that the media playback system does not have at least one registered account with the first streaming audio service, wherein a registered account with the first streaming audio service permits the playback device to stream the particular audio track from the server of the first streaming audio service;
in response to determining that the media playback system does not have at least one registered account with the first streaming audio service, sending, via the network interface of the playback device to a cloud computing system, a request for one or more respective second sources of the particular audio track at one or more second streaming audio services, wherein the media playback system has respective registered accounts with the one or more second streaming audio services, the request indicating the first URI of the particular audio track;
receiving, via a network interface of the one or more servers of the cloud computing system from the playback device, the request for one or more respective second sources of the particular audio track at the one or more second streaming audio services;
in response to receiving the request for one or more respective second sources of the particular audio track at the one or more second streaming audio services, querying, via the one or more servers of the cloud computing system, a media-item database for second URIs corresponding to the first URI, the second URIs representing respective second sources of the particular audio track at respective servers of the one or more second streaming audio services; and
causing, via the one or more servers of the cloud computing system, the playback device to play back the particular audio track from a particular second source of the particular audio track at one or more servers of a given second streaming audio service by transmitting, via the network interface of the one or more servers of the cloud computing system to the playback device, a given second URI representing the particular second source of the particular audio track at the one or more servers of the given second streaming audio service.

9. The method of claim 8, wherein querying the media-item database for second URIs corresponding to the first URI comprises:
querying the media-item database for a particular global identifier corresponding to the first URI, the particular global identifier unique to the particular audio track within the media-item database; and
retrieving, from the query, second URIs corresponding to the particular global identifier.

10. The method of claim 8, wherein querying the media-item database for second URIs corresponding to the first URI comprises:

receiving, via the network interface of the one or more servers of the cloud computing system, metadata of the particular audio track;

querying the media-item database for audio tracks having metadata that matches the metadata of the particular audio track; and retrieving, from the query, the second URIs corresponding to the first URI.

11. The method of claim 10, wherein querying the media-item database for audio tracks having metadata that matches metadata of the particular audio track comprises determining that the audio tracks having metadata that matches metadata of the particular audio track have metadata matching at least an artist name and a track title of the particular audio track.

12. The method of claim 8, wherein causing the playback device to play back the particular audio track from the particular second source of the particular audio track at one or more servers of a given second streaming audio service comprises causing the playback device to play back the particular audio track by playing back an Internet radio station based on the particular audio track.

13. The method of claim 8, wherein causing the playback device to play back the particular audio track from the particular second source of the particular audio track at one or more servers of the given second streaming audio service comprises transmitting, via the network interface of the one or more servers of the cloud computing system to the playback device, multiple second URIs representing the respective second sources of the particular audio track at respective servers of the one or more second streaming audio services, and wherein the control device is configured to:

display, within a controller interface of the media playback system, a list of the second sources of the particular audio track;

receive, via the controller interface of the media playback system, input data indicating a selection of the particular second source of the particular audio track at the one or more servers of the given second streaming audio service; and transmit, via a network interface to the playback device, an instruction that causes the playback device to queue the given second URI for playback.

14. The method of claim 8, wherein each source represented by a URI is a respective network location at which a respective audio track is hosted.

15. A tangible, non-transitory, computer-readable media having stored therein instructions executable by one or more processors to cause a system to perform operations, the system comprising (i) a media playback system comprising a control device and a playback device connected via a local area network and (ii) one or more servers of a cloud computing system, the one or more servers of the cloud computing system connected to the playback device via a wide area network, the operations comprising:

receiving, via a network interface of the playback device from the control device, an instruction to queue a first uniform resource identifier (URI) of a particular audio track in a queue on the playback device for playback via one or more speakers of the playback device, the first URI representing a first source of the particular audio track at a server of a first streaming audio service;

determining, via one or more processors of the playback device, that the media playback system does not have at least one registered account with the first streaming audio service, wherein a registered account with the first streaming audio service permits the playback device to stream the particular audio track from the server of the first streaming audio service;

in response to determining that the media playback system does not have at least one registered account with the first streaming audio service, sending, via the network interface of the playback device to a cloud computing system, a request for one or more respective second sources of the particular audio track at one or more second streaming audio services, wherein the media playback system has respective registered accounts with the one or more second streaming audio services, the request indicating the first URI of the particular audio track;

receiving, via a network interface of the one or more servers of the cloud computing system from the playback device, the request for one or more respective second sources of the particular audio track at the one or more second streaming audio services;

in response to receiving the request for one or more respective second sources of the particular audio track at the one or more second streaming audio services, querying, via the one or more servers of the cloud computing system, a media-item database for second URIs corresponding to the first URI, the second URIs representing respective second sources of the particular audio track at respective servers of the one or more second streaming audio services; and causing, via the one or more servers of the cloud computing system, the playback device to play back the particular audio track from a particular second source of the particular audio track at one or more servers of a given second streaming audio service by transmitting, via the network interface of the one or more servers of the cloud computing system to the playback device, a given second URI representing the particular second source of the particular audio track at the one or more servers of the given second streaming audio service.

16. The tangible, non-transitory, computer-readable media of claim 15, wherein querying the media-item database for second URIs corresponding to the first URI comprises:

querying the media-item database for a particular global identifier corresponding to the first URI, the particular global identifier unique to the particular audio track within the media-item database; and retrieving, from the query, second URIs corresponding to the particular global identifier.

17. The tangible, non-transitory, computer-readable media of claim 15, wherein querying the media-item database for second URIs corresponding to the first URI comprises:

receiving, via the network interface of the one or more servers of the cloud computing system, metadata of the particular audio track;

querying the media-item database for audio tracks having metadata that matches the metadata of the particular audio track; and retrieving, from the query, the second URIs corresponding to the first URI.

18. The tangible, non-transitory, computer-readable media of claim 17, wherein querying the media-item database for audio tracks having metadata that matches metadata of the particular audio track comprises determining that the audio tracks having metadata that matches metadata of the particular audio track have metadata matching at least an artist name and a track title of the particular audio track.

19. The tangible, non-transitory, computer-readable media of claim 15, wherein causing the playback device to play back the particular audio track from the particular second source of the particular audio track at one or more servers of a given second streaming audio service comprises causing the playback device to play back the particular audio track by playing back an Internet radio station based on the particular audio track.

20. The tangible, non-transitory, computer-readable media of claim 15, wherein causing the playback device to play back the particular audio track from the particular second source of the particular audio track at one or more servers of the given second streaming audio service comprises transmitting, via the network interface of the one or more servers of the cloud computing system to the playback device, multiple second URIs representing the respective second sources of the particular audio track at respective servers of the one or more second streaming audio services, and wherein the control device is configured to:
- display, within a controller interface of the media playback system, a list of the second sources of the particular audio track;
- receive, via the controller interface of the media playback system, input data indicating a selection of the particular second source of the particular audio track at the one or more servers of the given second streaming audio service; and
- transmit, via a network interface to the playback device, an instruction that causes the playback device to queue the given second URI for playback.

* * * * *